US008620824B2

(12) United States Patent
Reno

(10) Patent No.: US 8,620,824 B2
(45) Date of Patent: Dec. 31, 2013

(54) PIN PROTECTION FOR PORTABLE PAYMENT DEVICES

(75) Inventor: James Donald Reno, Scotts Valley, CA (US)

(73) Assignee: CA, Inc., Islandia, NY (US)

( * ) Notice: Subject to any disclaimer, the term of this patent is extended or adjusted under 35 U.S.C. 154(b) by 67 days.

(21) Appl. No.: 13/113,145

(22) Filed: May 23, 2011

(65) Prior Publication Data

US 2011/0295753 A1 Dec. 1, 2011

Related U.S. Application Data

(60) Provisional application No. 61/349,444, filed on May 28, 2010.

(51) Int. Cl.
*G06Q 20/00* (2012.01)
*G06K 5/00* (2006.01)

(52) U.S. Cl.
USPC .............................. 705/72; 705/65; 235/380

(58) Field of Classification Search
USPC .......................................................... 705/72
See application file for complete search history.

(56) References Cited

U.S. PATENT DOCUMENTS

| 6,234,389 | B1 * | 5/2001 | Valliani et al. ................. 235/380 |
| 7,228,438 | B2 * | 6/2007 | Bushmitch et al. ............ 713/193 |
| 2007/0282756 | A1 * | 12/2007 | Dravenstott et al. ............ 705/72 |
| 2008/0189214 | A1 * | 8/2008 | Mueller et al. .................. 705/65 |
| 2009/0070583 | A1 * | 3/2009 | von Mueller et al. .......... 713/168 |
| 2010/0131764 | A1 * | 5/2010 | Goh .............................. 713/171 |

* cited by examiner

*Primary Examiner* — Charles C Agwumezie
(74) *Attorney, Agent, or Firm* — Quinn Law Group, PLLC

(57) ABSTRACT

A method and system of encrypting a Personal Identification Number (PIN) using a portable payment device includes a portable payment device in communication with a network and a payment processor, and may be configured to receive a first encryption key from the payment processor, to receive a PIN, to encrypt the PIN using the first key, and to provide the encrypted PIN to the payment processor in a form useable to process a payment authorization message or transaction request. The first key may be protected by cryptographic camouflaging using a password. The password may be received by the device and used to decamouflage the first key, and the decamouflaged first key may be used to encrypt the PIN. In one configuration, the first key may be a symmetric key, such that a PIN encrypted by the first key may be of a standard format usable in existing payment systems.

15 Claims, 3 Drawing Sheets

PIN PROTECTION FOR PORTABLE PAYMENT DEVICES

CROSS-REFERENCE TO RELATED APPLICATIONS

This application claims the benefit of U.S. Provisional Patent Application No. 61/349,444, filed on May 28, 2010, which is hereby incorporated by reference in its entirety.

TECHNICAL FIELD

The invention relates to encryption of a PIN by a payment device.

BACKGROUND

Traditional payments using payment cards can be broadly separated into two categories: those in the physical world and those in the online world. In the online world, using a payment card requires entry of at least the card number, and possibly other aspects of the account such as the expiration date or a card security code. In the physical world these mechanisms are sometimes used, but more often the card is "swiped," that is, there is some device at the point-of-sale (POS) that reads the card information from the magnetic stripe on the back of the card.

A payment card often has an associated Personal Identification Number (PIN) that serves as an authentication mechanism when the card is used. For example, using a card with an ATM requires providing the card to a card reader in the ATM and entering the PIN into the ATM. In purchase situations, a debit card may be used with or without the debit card's PIN. When the PIN is not used, the transaction is processed as "signature debit." When the PIN is used, it is processed as "PIN debit." A PIN debit transaction may have certain advantages for merchants and card issuers, because the PIN debit transaction can typically be processed at a lower cost to the merchant and/or card issuer than a signature transaction. Therefore there is some incentive in the industry to support the use of PINs.

In traditional POS systems there is considerable technology involved in the handling of PINs, in order to ensure their security. There are standard methods of encrypting PINs, and related ways to provide security for encryption keys. For example, traditional POS systems usually provide tamper-proof hardware devices for key protection.

Mechanisms are emerging to enable payments to proceed using a portable platform, e.g., a mobile phone or a portable computing (PC) device, for on line commerce or physical world commerce. In some cases these mechanisms involve manual entry of card information. In others, a small device may be attached to the mobile phone or PC that allows the card to be swiped to read the magnetic stripe. As such, the portable platform may be used as a replacement for the point-of-sale (POS) device for a "signature debit" transaction. However, because the portable payment system consists of commonly available hardware (e.g., phone or PC), using a software payment application, it is not tamper-proof, e.g., traditional POS key storage hardware and/or management mechanisms are not available, and therefore the portable payment platform cannot be used to securely process a transaction as a "PIN debit" transaction.

SUMMARY

A method and system are provided herein for encrypting a Personal Identification Number (PIN) using a portable payment device, wherein the encrypted PIN may be provided in a payment authorization message to a payment processor and to a payment network in a form useable to process a payment authorization message or transaction payment request. By providing a method and system to securely encrypt a PIN using the portable payment device, the portable payment device may be used as a replacement for a traditional point-of-sale (POS) device to securely process "PIN debit" transactions.

A system is provided for encryption of a PIN by a device configured as a portable payment device, which may be, by way of non-limiting example, a portable computer (PC), a notebook, a mobile phone, or a personal digital assistant, the system including a payment processor configured to provide a first key to the device, and further including a network. The device is configured to communicate with the payment processor and the network and is further configured to receive a first encryption key from the payment processor, to receive a PIN, to encrypt the PIN using the first key, and to provide the encrypted PIN to the payment processor to process a payment authorization message. The first key may be protected by the payment processor prior to being provided to the device by cryptographically camouflaging the first key using a password. The device may be further configured to receive the password, and to decamouflage the first key using the password, such that the decamouflaged first key may be used to encrypt the PIN. The term "decamouflage" as used herein refers to decrypting a key or other datum which has been previously encrypted or protected using a method of cryptographic camouflage. Similarly, a "decamouflaged key" as that term is used herein, is a key which has been decrypted after having been previously encrypted or protected using a method of cryptographic camouflaging. The first key may be a symmetric key, such that a PIN encrypted by the first key may be of a standard format usable in existing payment systems and networks. Alternatively, the first key may be the public key of an asymmetric key pair, wherein the payment processor is configured to decrypt the encrypted PIN using a second key which is the private key of the asymmetric key-pair, then re-encrypt the PIN using a third symmetric key to provide a PIN encrypted in a standard format.

A method is also provided for processing a payment authorization message using a portable payment device in communication with a payment processor through a network, wherein the portable payment device is configured to encrypt a PIN inputted into the device to authorize a payment transaction. The method includes receiving a first encryption key from the payment processor using a device configured as a portable payment device, which may be, by way of example, a PC, a notebook, a mobile phone, or a personal digital assistant; inputting a PIN into the device and encrypting the PIN with the first key using the device. The method further includes providing a payment authorization message to the payment processor using the device, wherein the encrypted PIN is included in the payment authorization message; and processing the payment authorization message using the payment processor. The first key may be protected by cryptographically camouflaging the first key using a password such that encrypting the PIN with the first key further includes inputting the password into the device to decamouflage the first key using the password, then encrypting the PIN using the decamouflaged first key. Alternatively, the method may include decrypting the encrypted PIN with a second key using the payment processor; re-encrypting the decrypted PIN with a third key using the payment processor; and substituting the re-encrypted PIN for the encrypted PIN in the payment authorization message prior to processing the payment authorization message using the payment processor.

The above features and advantages and other features and advantages of the present invention are readily apparent from the following detailed description of the best modes for carrying out the invention when taken in connection with the accompanying drawings.

DETAILED DESCRIPTION

Figure 1:
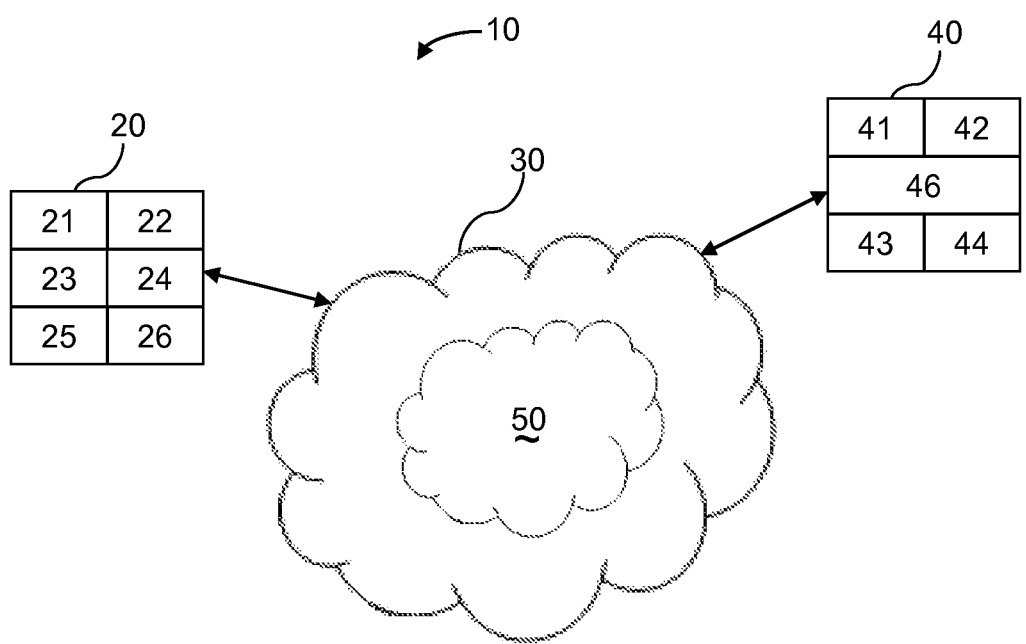
FIG. 1 is a schematic illustration of a system for encrypting a PIN using a portable payment device.

Referring to the drawings, wherein like reference numbers correspond to like or similar components throughout the several figures, FIG. 1 shows a schematic illustration of a system 10 for encrypting a personal identification number (PIN) when using a portable payment device to conduct a payment transaction between a merchant and a customer, such as portable payment device 20, which may be any of a variety of portable devices such as a portable computer (PC), a laptop, a notebook, a personal digital assistant (PDA), a tablet, a phone or another portable device configured for mobile communication, including communication with a network 30, which may be, for example, the Internet. The portable payment device 20 is configured to communicate with the network 30 through an interface 21, which may be a wireless or wired interface. Interface 21 may be a modem, a mobile browser, a wireless internet browser or a similar means suitable for accessing the network 30.

The portable payment device 20 further includes a memory 23, a central processing unit (CPU) 22 and a payment application 26. The memory 23 can include, for example, Read Only Memory (ROM), Random Access Memory (RAM), electrically-erasable programmable read only memory (EEPROM), etc., of a size and speed sufficient for executing one or more algorithms included in the payment application 26 activated on the portable payment device 20.

The portable payment device 20 includes an input 25 configurable to receive input from a user through which the user may input a PIN and/or transaction information, including, for example, a payment or transaction amount, payment account information, and/or merchant account information. The input 25 may be configured as a keypad, a touchpad, an electronic receiver, a magnetic card reader, or another input configured to receive information related to a payment transaction which may be integrated in the device 20 or operatively attachable to device 20. Information may be manually keyed into input 25 or inputted by other means, including from a magnetic card stripe, a SIM card or a transponder, or through any suitable contact or contactless means, which may include communication through a wireless connection such as RFID, Bluetooth™ or another near field communication means, or through a USB port or other similar means of contact. The portable payment device 20 may include a display configurable to display the payment application, a payment application menu and transaction and payment related information.

The portable payment device 20 is configured with the payment application 26 which is used by the merchant to process transaction payments received from one or more customers. The device 20 and the payment application 26 are in communication with the payment processing system 40, wherein the payment processing system 40 and the payment application 26 have been configured to process payment requests on behalf of the merchant. In configuring the payment application 26 on the merchant's portable payment device 20, and specifically for transactions and payments made on behalf of the merchant, the merchant may have previously been required to provide merchant information to the payment processing system 40, including merchant identification, details of the merchant's acquiring bank account or other information required to activate the payment application 26 on the merchant's portable payment device 20. The terms merchant and customer, as used herein, are intended as general terms and to be non-limiting. For example, a merchant may be a person or business, a retailer, a service provider, or other entity receiving payment for goods or services generally. A customer refers generally to the person, business or other entity providing payment for the goods and services received.

During activation, the merchant's portable payment device 20 may be configured with a PIN encrypting algorithm and one or more encryption keys, which may be specific to the merchant. By providing a method and system to securely encrypt a PIN using the portable payment device 20, the portable payment device 20 may be used as a replacement for a traditional point-of-sale (POS) device to securely process "PIN debit" transactions. The PIN encryption scheme included in the payment application 26 may typically be one known to and in use by the payment industry, for example, the PIN encryption scheme may be any of the Payment Card Industry (PCI) approved PIN encryption schemes, or may be an encryption scheme provided by the payment processor and/or network with which the merchant is associated. During configuration of the payment application 26 on device 20, the merchant may be required to select or may be provided a password which may be used in a process of protecting PIN encryption keys.

The payment application 26 may include one or more algorithms for encryption of a PIN associated with a payment account or a payment card, such as a debit card. The payment application 26 may be configured with one or more encryption keys, which may be stored in a database 24 on device 20, and which are provided for use in encrypting a PIN or PINS inputted into device 20. The algorithms and keys which may be associated with the payment application 26 configured for a merchant account may include algorithms and data structures well established in the payments industry. The payment application 26 may further include an algorithm for camouflaging or decamouflaging an encryption key. A method of cryptographic camouflaging may be used to camouflage the encryption key(s) provided to the database 24.

The portable payment device 20 is in communication with a payment processing system 40 through a network 30. The network 30 may be, for example, the Internet. The network 30 includes and is in communication with a payment network 50, which may include, for example, a combination of one or more of a merchant account provider (MAP), an independent sales organization (ISO), a payment gateway, a payment processor, a card association or bankcard payment network such as the VISA™ and MasterCard™ payment networks, and one or more financial institutions including acquiring or merchant banks and card-issuing or issuing banks in communication with one or more of the other and involved in or responsible for processing the payment transaction request and payment.

The payment processing system 40 is responsible for processing the payment transaction through the payment network, and may be a payment processor or one or a combination of a merchant account provider, a payment gateway, an ISO and a payment processor configured to process payment transactions through the payment network 50. The payment processing system 40 is configurable to communicate with the network 30 including the payment network 50 through an interface 41, for example, a website, to interface with the portable payment device 20 through the interface 21. The payment processing system 40 may be further configurable to communicate with the portable payment device 20 by directly interfacing with the portable payment device 20, e.g., through a means other than the network 30, such as through an intranet or other dedicated interface. The payment processing system 40 is configured with a memory 43 and a CPU 42 and may include one or more servers performing various functions, which may include requesting and authorizing payment transactions. The memory 43 of the system 40 can include, by way of example, ROM, RAM, EEPROM, etc., of a size and speed sufficient for conducting payment transaction authorization and authentication processes or other tasks and processes related to payment processing and for configuring, providing and/or activating algorithms, keys, secrets, and camouflaging schemes related to the payment transaction processing methods and systems as described herein. The payment processing system 40 may include one or more databases 44 including account, transaction, and other information related to payment transaction processing, methods and systems as described herein.

Additionally, the payment processing system 40 may include a payment processing application 46 including one or more algorithms for encryption of a PIN associated with a payment account or payment card, such as a debit card. The payment processing application 46 may be configured with one or more encryption keys, which may be associated with a merchant account and which may include algorithms and data structures well established in the payments industry. The payment processing application 46 may further include an algorithm for protecting an encryption key prior to providing the encryption key to a merchant. The encryption key may be protected by a method of camouflaging, which may be a method of cryptographic camouflaging.

Cryptographic camouflage technology is described in detail in U.S. application Ser. No. 12/871,559 filed Aug. 30, 2010 and claiming priority to provisional application No. 61/240,010, filed Sep. 4, 2009. U.S. patent application Ser. No. 12/871,559 and the present application are commonly owned by Computer Associates Think, Inc. A brief summary of cryptographic camouflaging as a mechanism for protecting encryption keys is provided herein.

To cryptographically camouflage an encryption key, the encryption key is provided to a cryptographic camouflaging process as any symmetric key type. For example, the encryption key to be camouflaged may be a Data Encryption Standard (DES) key, an Advanced Encryption Standard (AES) key, or other symmetric key which adheres to payment industry standards for PIN encryption. In a non-limiting example, the PIN encryption key is a DES key, where the DES key is of size 8 bytes. In each byte, bits 2 through 8 are random, and the first bit is a parity bit, which is the parity of bits 2 through 8. The parity bit is not needed to perform cryptographic actions with a DES key. The key is camouflaged under a password, where the password may be a password selected by or provided to the merchant during configuration of payment application 26 on device 20. As would be understood by those skilled in the art, other datum may be used to camouflage the key other than a password, within the scope of the claimed invention.

To cryptographically camouflage a PIN encryption key, the following steps are performed. In a first camouflaging step, the parity bit in each byte of the key is randomized to produce a modified key. The modified key is encrypted or obfuscated in a second camouflaging step using a password, which may be the merchant password, to provide a camouflaged key. The method of encryption or obfuscation used to provide the camouflaged key may be one of various methods. By way of non-limiting example, three possible methods are provided. The first method uses a Mask Generation Function to create a mask from the password and XOR (Exclusive OR) the mask with the modified key to provide a cryptographically camouflaged key. The second method encrypts the modified key with a new key derived from the password to provide a cryptographically camouflaged key. When using this second method, no padding or other information should be stored that can help an intruder recognize a failed decryption attempt with a wrong password, e.g., a password other than the password associated with the merchant's account. A third possible method XOR the (right hand) end of the modified key with the password to provide a cryptographically camouflaged key. While three possible methods are described herein to encrypt or obfuscate a modified key to provide a cryptographically camouflaged key, those familiar with the art will recognize various alternative methods can be employed for encrypting or obfuscating a modified key to provide a cryptographically camouflaged key.

Note that an attacker using a brute force attack with all possible passwords, and who has full knowledge of the camouflage algorithm, will always produce a validly formatted PIN encryption key, except for the parity bits. The attacker has no way of recognizing when the correct password was used. A crucial feature of cryptographic camouflage is that structure, if any, should be removed from the datum, which in the present example is the PIN encryption key to be camouflaged. In the case of DES keys, this applies to the parity bits. However, it is understood that a cryptographic camouflaging technique based on the method described herein, e.g., a combination of modifying and encrypting or obfuscating a key using a password, can be used for any other standard symmetric key in use today, for example, an AES (Advanced Encryption Standard) key.

Figure 2:
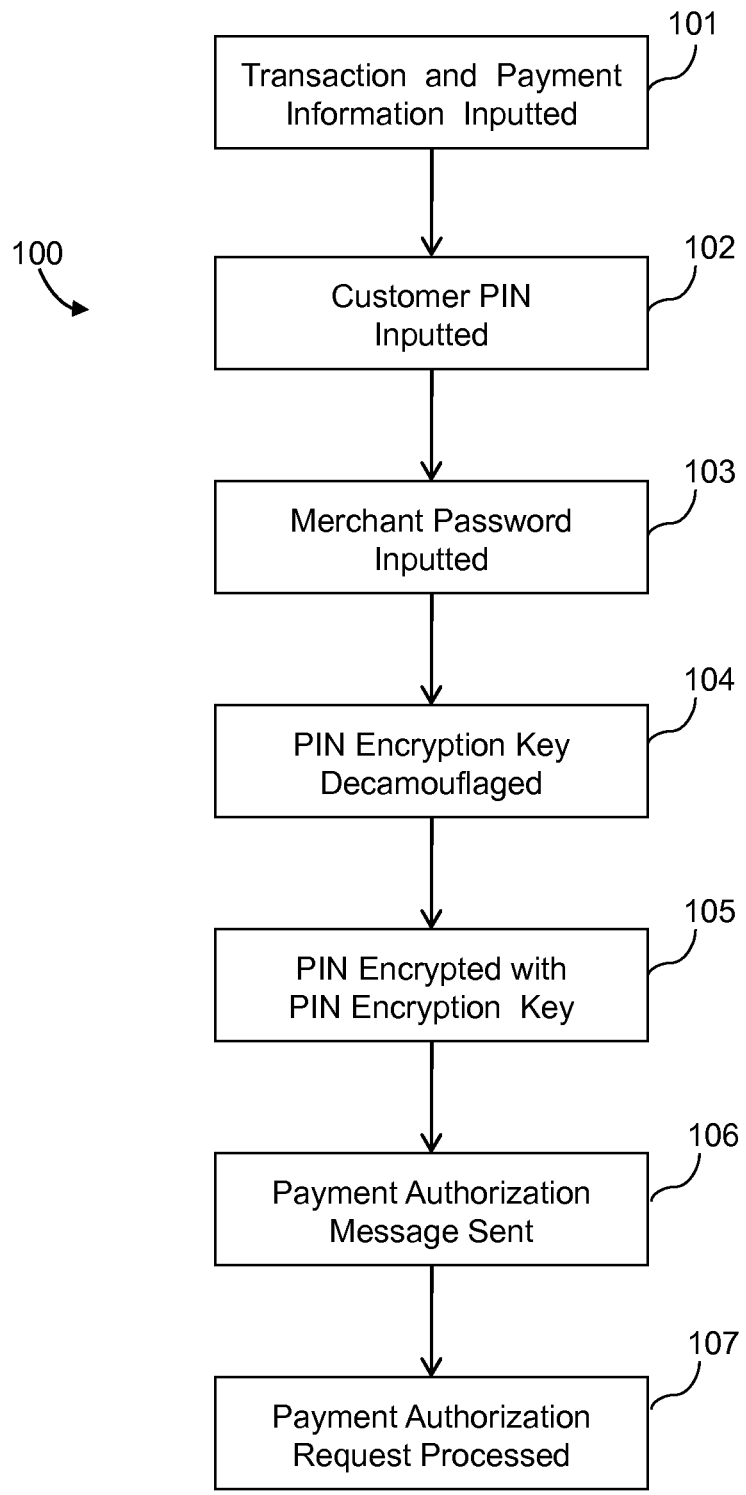
FIG. 2 is a schematic illustration of a process for encrypting a PIN using a portable payment device and a camouflaged encryption key.

Referring now to FIG. 2, generally indicated at 100 is a schematic illustration of a process or method for encrypting a personal identification number (PIN) using a portable payment device, such as the device 20 of FIG. 1, during a payment transaction between a merchant and a customer. The portable payment device 20 is configured for use with the method 100 with a payment application 26, which has been downloaded to the portable payment device 20. The payment application 26 includes a PIN encryption algorithm and one or more encryption keys which may be specific to the merchant's portable payment device 20. For the method 100, the specific PIN encryption may be performed using algorithms and data structures that are already well-established in the industry. In this approach, the PIN encryption key is typically a symmetric key, which adheres to industry standards for PIN encryption. The encrypted PIN thus would be of a standard format, and usable in existing payment systems and networks.

The payment application 26 is further configured for use in the method 100 with a camouflaging algorithm, which is used to protect the PIN encryption key. The merchant, during configuration of the payment application 26 on the device 20, selects or is provided a password which is used in the process of camouflaging the encryption keys provided to the device 20. The encryption key(s) to be used by the payment application 26 are camouflaged and are downloaded to the merchant's portable payment device 20. Camouflaging the encryption key(s) thus enables the portable payment device 20 to be used to securely conduct payment mechanisms such as "PIN debit" transactions, by providing a means to securely store the PIN encryption key(s) on the device 20. The encryption key(s) may be camouflaged using cryptographic camouflage, as described previously.

At step 101, transaction and payment information is inputted into the portable payment device 20. The inputted transaction and payment information may include, for example, the amount of the payment or transaction; a description of the transaction; the customer's payment account information such as the account number, the expiration date, and/or the card security code; merchant account information such as the merchant identification number; and the date and time of the transaction.

At step 102, the customer inputs a PIN associated with the customer's payment account into the device 20, thereby providing customer authorization of the transaction as a "PIN debit" transaction. At step 103, the merchant inputs the merchant password into the device 20. At step 104, the payment application 26 on the device 20 uses the merchant password to decamouflage or otherwise unprotect a PIN encryption key. At step 105, the encryption key is used to encrypt the customer's PIN, using an encryption method which provides an encrypted PIN in a standard format usable in existing payment systems and networks. The encryption key may then be recamouflaged or otherwise restored to a secured or protected state.

At step 106, a payment authorization message, including the encrypted PIN, is provided by the payment application 26 to the payment processing system 40, which includes, for example, the payment processing application 46. At step 107, the payment authorization message is processed through the payment network 50. Processing of the payment authorization message may include returning an authorization result from the system 40 to the device 20 for display, which may be, for example, a message indicating the payment request has been "approved" or "denied."

Figure 3:
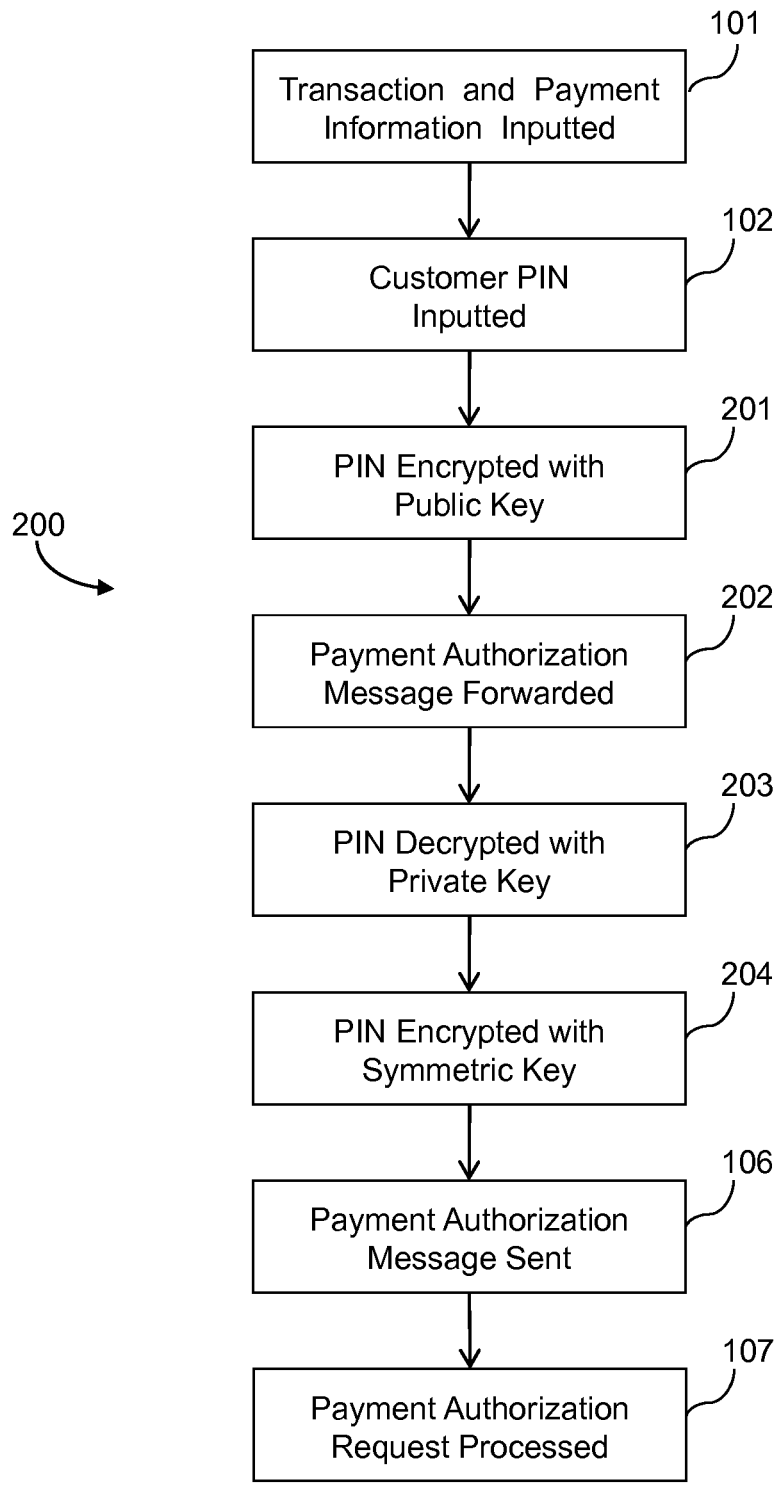
FIG. 3 is a schematic illustration of a process for encrypting a PIN using a portable payment device and a paired key encryption scheme.

FIG. 3 shows, generally indicated at 200, a schematic illustration of a alternative process or method for encrypting a PIN when using a portable payment device, such as the device 20 of FIG. 1, during a payment transaction between a merchant and a customer. In this alternative approach, rather than using a camouflaged symmetric key, an asymmetric keypair can be used, where the PIN is encrypted using a public key provided to the payment application 26, for example, from the merchant's payment processor. The encrypted PIN then is sent to the payment processor as part of the payment authorization message from the merchant, and the payment processor uses the associated private key to decrypt the PIN. The payment processor then re-encrypts the PIN using a symmetric key, for insertion into a standard payment network. The portable payment device 20 is configured for use with the method 200 with a payment application 26, which has been downloaded to the portable payment device 20. The payment application 26 includes a PIN encryption algorithm and one or more encryption keys. For the method 200, each of the one or more PIN encryption key may be one of an asymmetric keypair, e.g., a keypair consisting of a public key and a private key. The encryption key provided to the portable payment device 20 and the payment application 26 is a public key, which may be a public key specific to the merchant, or provided from the merchant's payment processor.

At step 101, transaction and payment information is inputted into the portable payment device 20. The inputted transaction and the payment information may include, for example, the amount of the payment or transaction; a description of the transaction; the customer's payment account information such as the account number, the expiration date, and/or the card security code; the merchant account information such as the merchant identification number; and the date and time of the transaction. At step 102, the customer inputs a PIN associated with the customer's payment account into the device 20, thereby providing customer authorization of the transaction as a "PIN debit" transaction.

At step 201, the payment application 26 on device 20 uses the public key of an asymmetric keypair to encrypt the PIN. At step 202, a payment authorization message, including the encrypted PIN, where the PIN has been encrypted using the public key, is forwarded by the merchant to the payment processor system 40, using the device 20.

At step 203, the payment processor system 40 uses the private key of the asymmetric keypair associated with the public key of the application 26 to decrypt the customer's PIN. At step 204, the payment processor system 40 then uses a symmetric key which adheres to industry standards for PIN encryption to provide an encrypted PIN in a standard format usable in existing payment systems and networks, to re-encrypt the customer's PIN.

At step 106, the payment authorization message, including the re-encrypted PIN, is sent by the payment processor system 40 for processing by the payment processing application 46. At step 107, the payment authorization message is processed through the payment network 50. Processing of the transaction payment request may include returning an authorization result from the system 40 to the device 20 for display, which may be, for example, a message indicating the payment request has been "approved" or "denied."

It would be understood that other variations are possible by combining the elements of the system and methods described herein. For example, other variations may include protection of the encryption key by a method other than cryptographic camouflaging, or encryption of the PIN by an industry standard method which uses an encryption key other than a symmetric key. Those having ordinary skill in the art will recognize that terms such as "encrypt," "key," "secret," "PIN," "password," "server," "website," "application," etc., are used descriptively of the figures, and do not represent limitations on the scope of the invention where other terms may be used in a generally equivalently descriptive manner.

While the best modes for carrying out the invention have been described in detail, those familiar with the art to which this invention relates will recognize various alternative designs and embodiments for practicing the invention within the scope of the appended claims.

The invention claimed is:

1. A system comprising a merchant portable payment device configured for encrypting a customer personal identification number (PIN), the system comprising:
the merchant portable payment device including a processor and memory configured to:
receive a payment application including a merchant password on the merchant portable payment device;
receive a first key from a payment processor in communication with the merchant portable payment device via a network;
wherein the first key is received by the merchant portable payment device as a protected key;

wherein the protected key has been cryptographically camouflaged by the payment processor using the merchant password;
store the protected first key on the merchant portable payment device;
receive a customer PIN inputted to the merchant portable payment device;
receive the merchant password inputted to the merchant portable device;
decamouflage the protected key using the password to provide the first key;
encrypt the customer PIN on the merchant portable payment device using the first key; and
send the encrypted PIN using the merchant portable payment device to the payment processor to process a payment authorization message.

2. The system of claim 1, wherein the first key is a symmetric key.

3. The system of claim 1, wherein the first key is a public key of an asymmetric key pair.

4. The system of claim 1, wherein:
the payment processor is configured to decrypt the encrypted customer PIN using a second key and to re-encrypt the customer PIN using a third key; and
the first key is different from the second key.

5. The system of claim 4, wherein the second key is a private key of an asymmetric keypair.

6. The system of claim 4, wherein the third key is a symmetric key.

7. A method for encrypting a customer personal identification number (PIN), the method comprising:
receiving a payment application including a merchant password on a merchant portable payment device;
receiving a first key on the merchant portable payment device from a payment processor in communication with the merchant portable payment device via a network;
wherein the first key is received by the merchant portable payment device as a protected key;
wherein the protected key has been cryptographically camouflaged by the payment processor using the merchant password;
storing the first key on the merchant portable payment device;
wherein the first key is received on the merchant portable payment device for use as a PIN encryption key;
inputting a customer PIN into the device; and
inputting the merchant password into the device;
decamouflaging the protected key on the merchant portable payment device using the merchant password to provide a decamouflaged first key;
encrypting the customer PIN utilizing the decamouflaged first key and the merchant portable payment device.

8. The method of claim 7, wherein the first key is a symmetric key.

9. The method of claim 7 further comprising:
recamouflaging the first key using the device, after encrypting the customer PIN.

10. The method of claim 7, wherein the first key is a public key of an asymmetric key pair.

11. The method of claim 7, further comprising:
providing the encrypted customer PIN to a payment processor using the merchant portable payment device;
decrypting the encrypted customer PIN with a second key using the payment processor;
wherein the first key and the second key are different keys; and
re-encrypting the decrypted customer PIN with a third key using the payment processor.

12. The method of claim 11, wherein the second key is a private key of an asymmetric keypair.

13. The method of claim 11, wherein the third key is a symmetric key.

14. A method for processing a payment authorization message, the method comprising:
receiving a payment application including a merchant password on a merchant portable payment device;
communicating with a payment processor through a network using the merchant portable payment device;
receiving a first key on the merchant portable payment device;
wherein the first key is:
configured as a PIN encryption key; and
is received on the merchant portable payment device from the payment processor in communication with the merchant portable payment device via the network;
wherein prior to receiving the first key on the merchant portable payment device, the first key is protected by cryptographically camouflaging the first key using the merchant password;
storing the first key on the merchant portable payment device;
inputting a customer personal identification number (PIN) into the device;
inputting the merchant password into the device;
decamouflaging the first key using the merchant password;
encrypting the customer PIN with the first key using the device;
providing a payment authorization message to the payment processor using the merchant portable payment device wherein the encrypted customer PIN is included in the payment authorization message.

15. The method of claim 14, further comprising:
decrypting the encrypted customer PIN with a second key using the payment processor;
wherein the first key and the second key are different keys;
re-encrypting the decrypted customer PIN with a third key using the payment processor; and
substituting the re-encrypted customer PIN for the encrypted customer PIN in the payment authorization message prior to processing the payment authorization message using the payment processor.

* * * * *